(12) United States Patent
Teng

(10) Patent No.: US 6,848,786 B1
(45) Date of Patent: Feb. 1, 2005

(54) EYEGLASSES HAVING A DETACHABLE SECOND FRAME

(75) Inventor: Wei-Che Teng, Tainan (TW)

(73) Assignee: Irene Corporation, Tainan (TW)

( * ) Notice: Subject to any disclaimer, the term of this patent is extended or adjusted under 35 U.S.C. 154(b) by 0 days.

(21) Appl. No.: 10/746,026

(22) Filed: Dec. 26, 2003

(51) Int. Cl.⁷ .................................................. G02C 1/00
(52) U.S. Cl. ............................. 351/83; 351/86; 351/154
(58) Field of Search ............................... 351/41, 83, 86, 351/154

(56) References Cited

U.S. PATENT DOCUMENTS 4,405,212 A * 9/1983 Cooper ........................ 351/43
5,631,716 A * 5/1997 Chao ........................... 351/41

* cited by examiner

Primary Examiner—Huy Mai
(74) Attorney, Agent, or Firm—Alan D. Kamrath; Nikolai & Mersereau, P.A.

(57) ABSTRACT

A pair of improved eyeglasses is disclosed. The eyeglasses comprises a first frame including a left opening and a right opening, a detachable second frame including two lenses aligned with the openings, a projected rim, a groove surrounded by the rim with the first frame being fitted therein by snapping, and two pairs of an upper tab and a lower tab forward the groove by a predetermined distance for fastening the first frame at the groove, and two temples pivotably coupled to ends of the first frame.

1 Claim, 2 Drawing Sheets

EYEGLASSES HAVING A DETACHABLE SECOND FRAME

BACKGROUND OF THE INVENTION

1. Field of the Invention

The present invention relates to eyeglasses and more particularly to a pair of eyeglasses having a detachable second frame having, for example, tinted lenses.

2. Description of Related Art

Eyeglasses are well known. Also, a pair of eyeglasses having hinged lenses is well known. One particular type of such eyeglasses is widely used by athlete in which in use, the lenses are pivoted from a top edge of the frame to cover openings of the frame. The present inventor thus seeks to provide a pair of eyeglasses having a detachable frame having, for example, tinted lenses for achieving the purposes of protecting the eyes from the sun's glare and many more in an improved way.

SUMMARY OF THE INVENTION

It is an object of the present invention to provide a pair of eyeglasses having a detachable second frame having, for example, tinted lenses so as to achieve the purposes of protecting the eyes from the sun's glare and many more.

To achieve the above and other objects, the present invention provides a pair of eyeglasses comprising a first frame including a left opening and a right opening; a second frame including two lenses aligned with the openings, a projected rim, a groove surrounded by the rim with the first frame being fitted therein by snapping, and two pairs of an upper tab and a lower tab forward the groove by a predetermined distance for fastening the first frame at the groove; and two temples pivotably coupled to ends of the first frame.

The above and other objects, features and advantages of the present invention will become apparent from the following detailed description taken with the accompanying drawings.

DETAILED DESCRIPTION OF THE PREFERRED EMBODIMENTS

Figure 1:
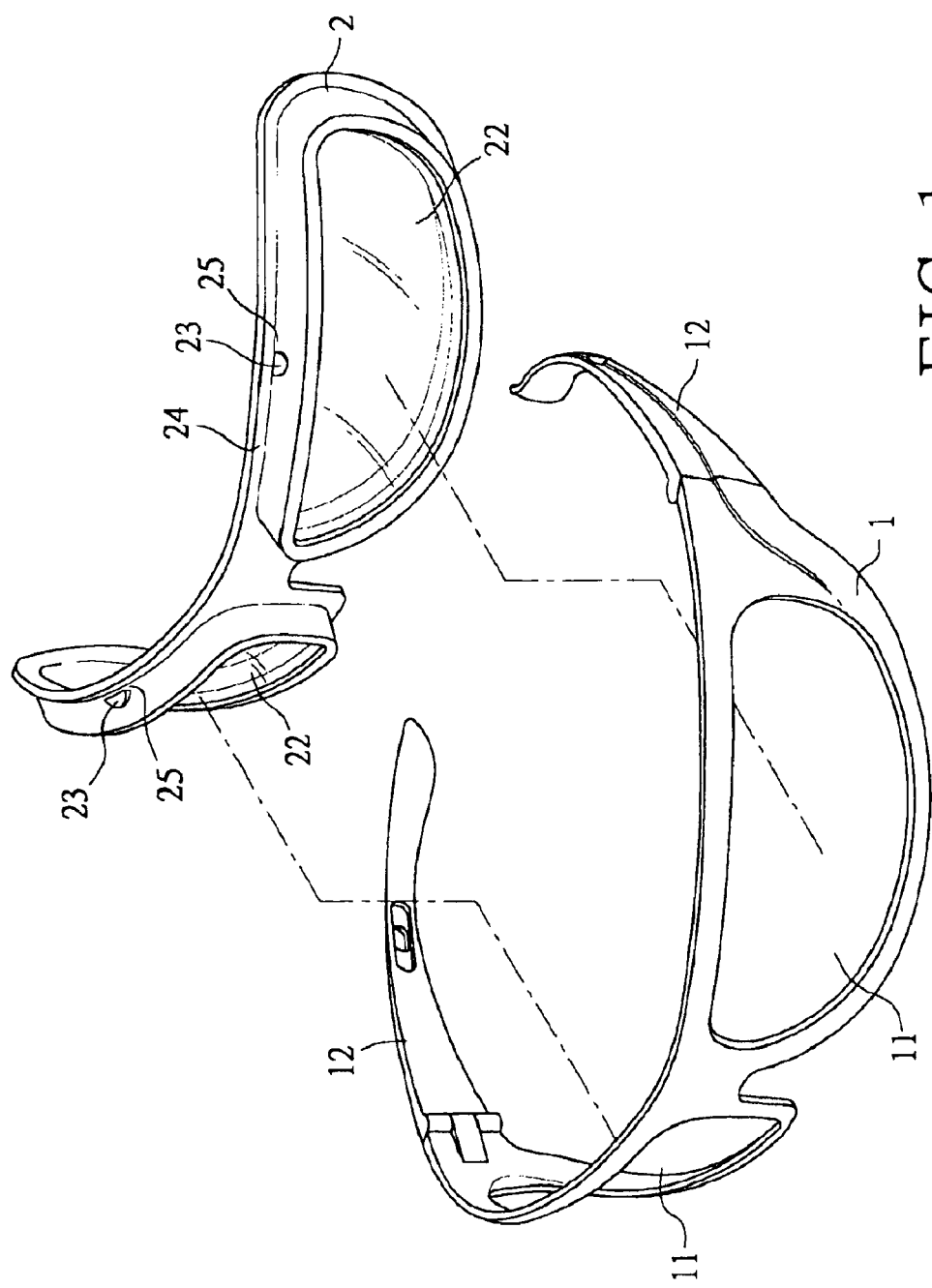
FIG. 1 is an exploded, perspective view of a preferred embodiment of eyeglasses according to the invention.
Figure 3:
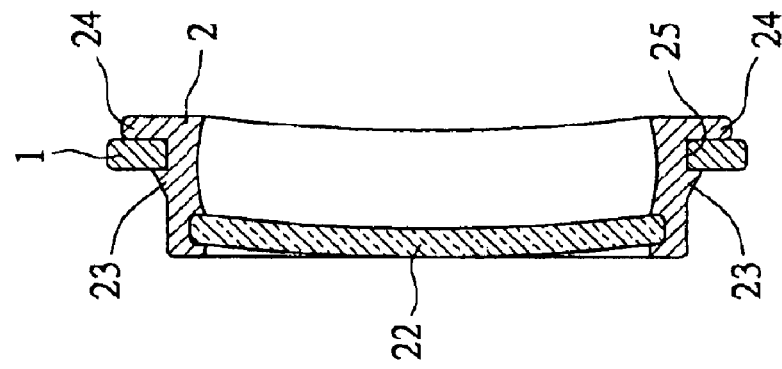
FIG. 3 is a cross-sectional view taken along upper and lower tabs of frame shown in FIG. 2.
Figure 2:
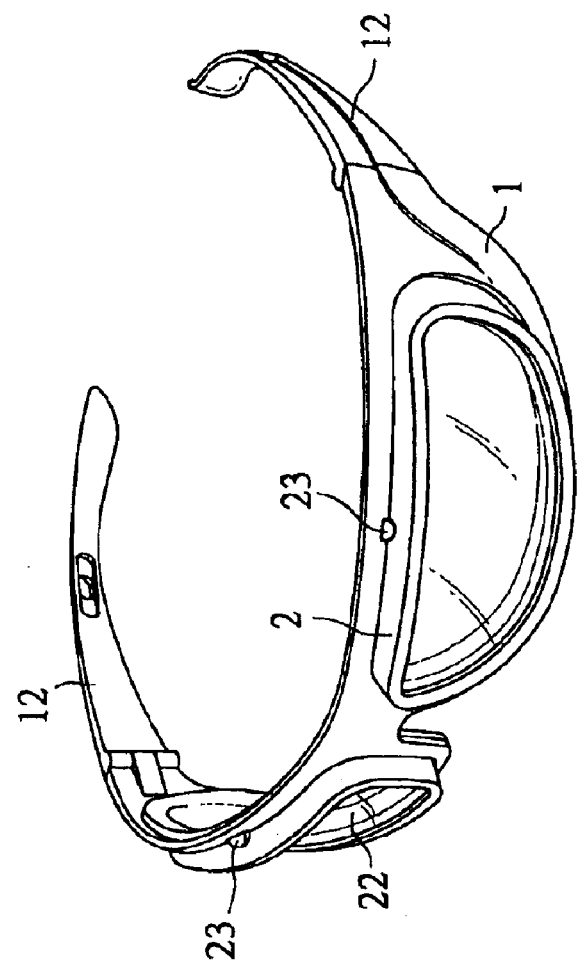
FIG. 2 is a perspective view of the assembled eyeglasses.

Referring to FIGS. 1, 2, and 3, a pair of eyeglasses in accordance with the invention is shown. The eyeglasses comprises a first frame 1 including left and right first openings 11, a separate second frame 2 including left and right second openings 22 with lenses (e.g., tinted lenses) fitted therein, a projected rim 24, a groove 25 surrounded by the rim 24 with the first frame 1 being fitted therein, and two pairs of upper and lower tabs 23 forward the groove 25 by a suitable distance for tightly fastening the first frame 1 at the groove 25, and two temples 12 pivotably coupled to ends of the first frame 1. Further, the lenses fitted in the second frame 2 are appropriately disposed in front of the openings 11 to enable a wearer to see clearly. Such detachable frame thus provides another advantage sought by some people.

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses, comprising:
   a first frame including a left opening and a right opening;
   a second frame including two lenses aligned with the openings, a projected rim, a groove surrounded by the rim with the first frame being fitted therein by snapping, and two pairs of an upper tab and a lower tab forward the groove by a predetermined distance for fastening the first frame at the groove; and
   two temples pivotably coupled to ends of the first frame.

* * * * *